Feb. 10, 1959 A. J. ROSENBERGER 2,872,816
LINKAGE MECHANISM FOR INDICATING INSTRUMENT
Filed Feb. 23, 1954 2 Sheets-Sheet 2
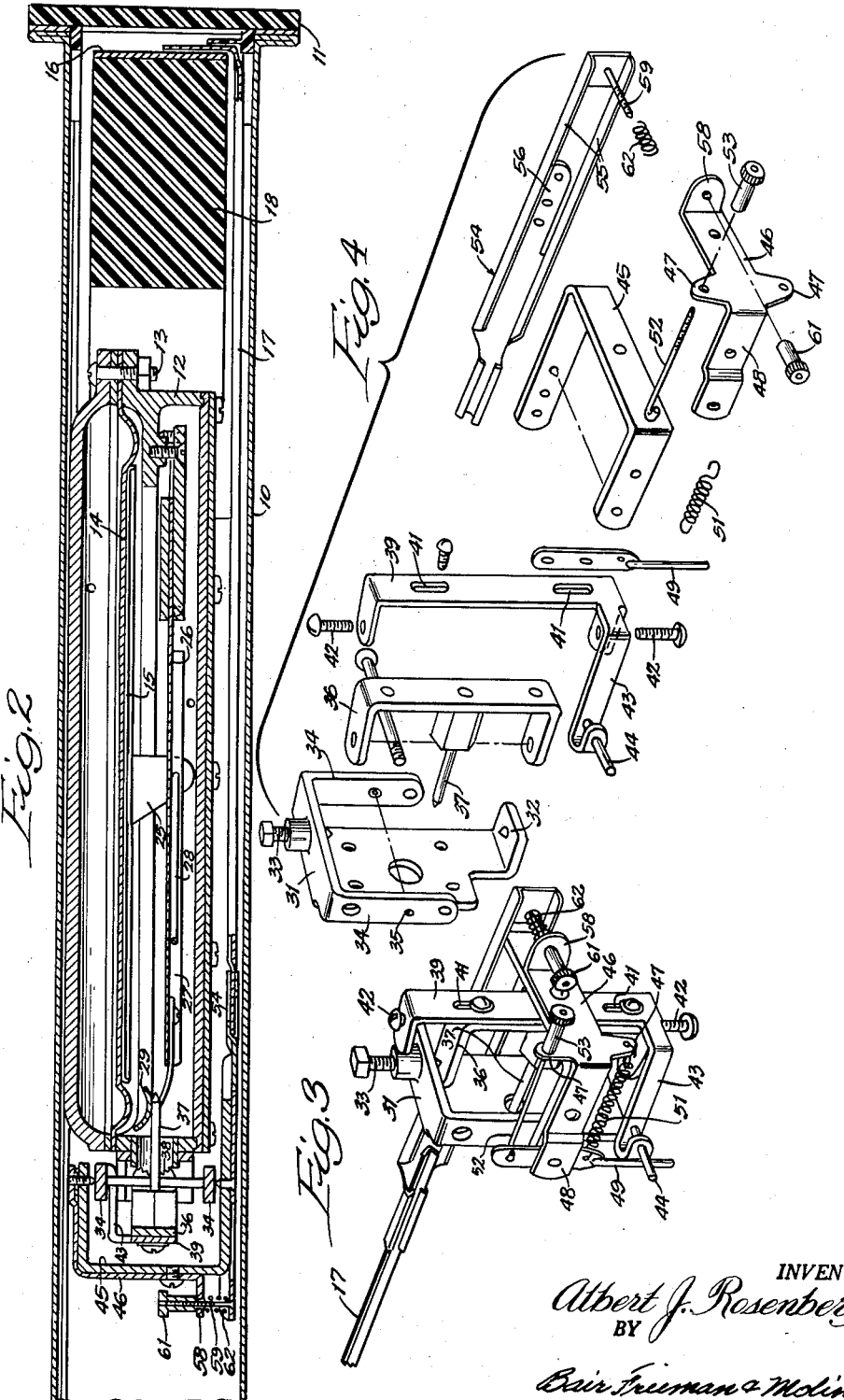
INVENTOR:
Albert J. Rosenberger,
BY
Bair Freeman & Molinare
ATTORNEYS.

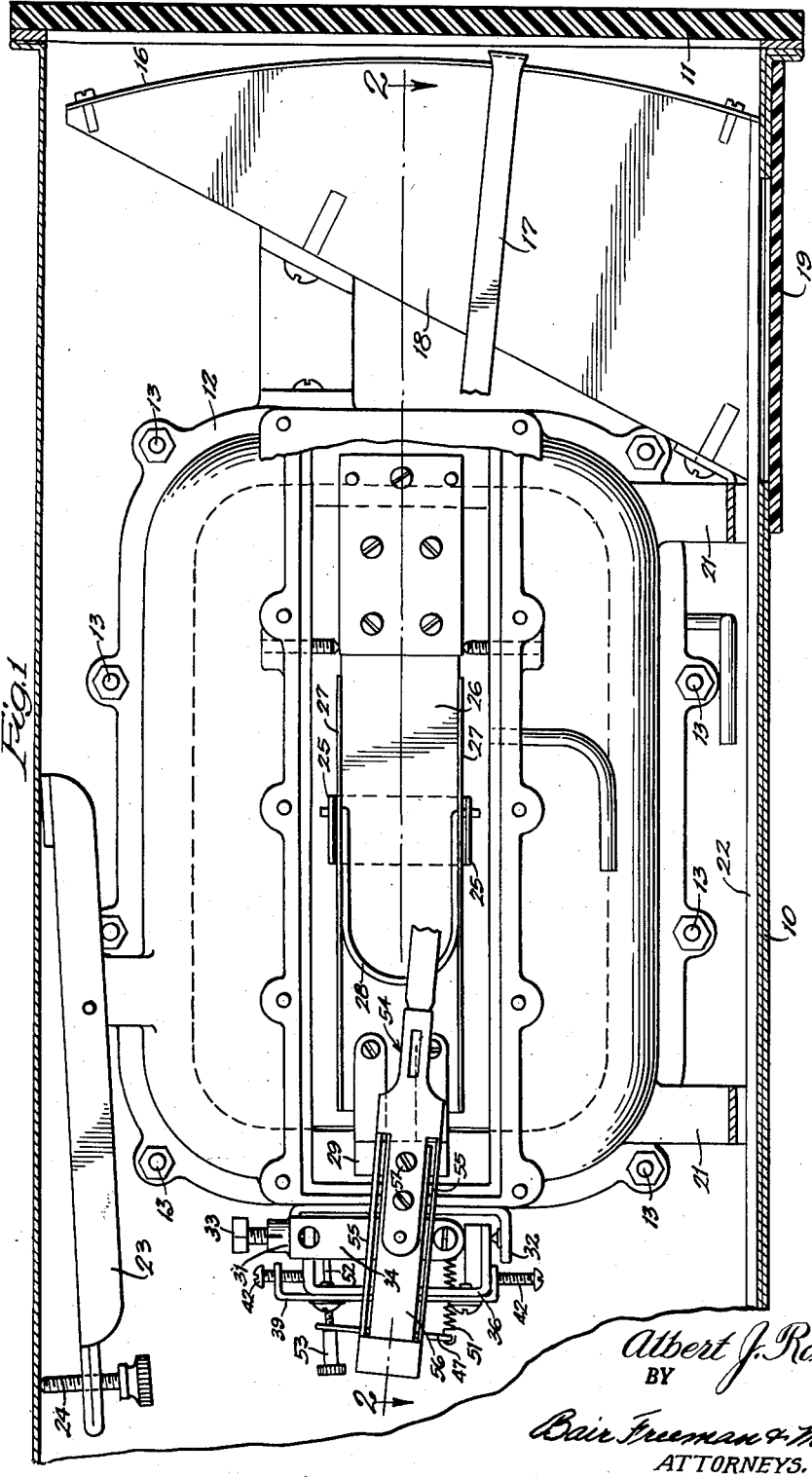

United States Patent Office 2,872,816
Patented Feb. 10, 1959

2,872,816

LINKAGE MECHANISM FOR INDICATING INSTRUMENT

Albert J. Rosenberger, Chicago, Ill., assignor, by mesne assignments, to Republic Flow Meters Company, Chicago, Ill., a corporation of Delaware Application February 23, 1954, Serial No. 411,765

8 Claims. (Cl. 73—406)

This invention relates to indicating instruments and more particularly to the adjustable mounting and operating means for the moving pointer of an instrument for indicating the instantaneous value of a condition.

It has been conventional practice for many years to mount industrial type indicating instruments such as draft gauges, furnace pressure gauges, air or fuel flow gauges and the like on central panels. All such gauges require adjustment from time to time to set the pointers to zero, to calibrate the instrument, to adjust the pointer clearance and the like. As heretofore constructed the instruments were enclosed in casings mounted on a panel and it was necessary in most cases to remove the instrument mechanism from the casing to adjust it.

It is one of the objects of the present invention to provide an indicating instrument in which all necessary adjustments can easily be made from one end of the casing without requiring removal of the instrument mechanism from the casing.

Another object is to provide an indicating instrument in which the pointer is moved in a plane by an element movable at right angles to the plane through a relatively simple linkage entirely supported at one end of the instrument body.

According to one feature, the linkage includes a pivoted operating member connected to the sensitive element to be moved thereby and a pivoted supporting member carrying the pointer with interengaging pins on the members to turn the supporting member when the operating member turns.

Another object of the invention is to provide an indicating instrument in which zero adjustment of the pointer is effected by moving the pin carried by one of the members in a direction toward or away from the pin carried by the other member.

In the preferred construction, one of the pins is pivotally mounted on the member which carries it and is moved about its pivot to effect the zero adjustment. The pivotally mounted pin may be urged against an adjustable stop by a spring which will yield in the event of excessive movement to prevent damage to the pointer.

Still another object is to provide an indicating instrument in which calibration is effected by sliding one of the pins longitudinally of the other.

According to one feature, the shiftable pin may be carried by a bracket slidably mounted on one of the members to be slid in a direction parallel to the other pin, thereby changing the point of engagement of the pins and the leverage between them.

A further object is to provide an indicating instrument of the diaphragm type in which the diaphragm is connected to a leaf spring through interengaging flanges and a simple spring clip and the pointer operating mechanism is moved by the leaf spring.

A still further object is to provide an indicating instrument in which variations in the effective area of the diaphragm as it moves are automatically compensated for in the linkage.

The above and other objects and features of the invention will be more readily apparent from the following description when read in connection with the accompanying drawing, in which:

Figure 1 is a side elevation of an instrument embodying the invention with the casing in section;

Figure 2 is a horizontal section on the line 2—2 of Figure 1;

Figure 3 is a perspective view of the pointer mounting and adjusting linkage; and Figure 4 is a disassembled view of the linkage.

The instrument of the present invention may be mounted in a generally rectangular casing 10 having a transparent front closure 11 and having a removable rear closure (not shown). The casing may be mounted in an opening in a panel to support the instrument in position adjacent to other relating instruments and if desired the casing may be of a size to receive a plurality of instrument mechanisms in side-by-side relationship.

The instrument itself, as shown, is adapted to sense and to indicate a fluid pressure or a pressure differential indicative of a condition which is to be indicated. As shown, the instrument comprises a hollow body 12 formed of two halves bolted together at their periphery by bolts 13 and which support a flexible diaphragm 14 between them. The diaphragm 14 is of conventional construction consisting of a flexible sheet clamped at its periphery between the casing halves and carrying a central rigid plate 15 terminating short of the periphery of the diaphragm. Fluid may be conducted into the casing through any suitable connections (not shown) to deflect the diaphragm from its neutral position in response to the differential of pressure on opposite sides of the diaphragm.

At its forward end the instrument body carries an arcuate scale 16 which is supported behind the transparent cover 11 and over which a pointer 17 may move. The scale 16 is supported on the forward curved surface of a generally triangular block 18 of translucent or transparent plastic material which is securely connected to the front end of the instrument body. The dial may be illuminated by a light source mounted outside of the casing and shining through a transparent portion 19 thereof into the base of the block 18, as more particularly described and claimed in my copending application Serial No. 407,464, filed February 1, 1954, now Patent No. 2,826,917.

The instrument body is mounted in the casing by providing thereon foot members 21 which may fit between tracks in the casing, as shown at 22, to position the instrument. The instrument is securely held in the casing by a lever 23 pivoted intermediate its ends on the top of the body and carrying an adjustable screw 24 at its rear end to engage the top wall of the casing and to press the instrument body securely between the top and bottom casing walls. The mounting features of the instrument are more fully disclosed and claimed in my copending application referred to above.

In order to transmit movement of the diaphragm to the pointer 17, the center plate 15 carries outwardly projecting flanges 25 spaced vertically apart. A leaf spring 26 is anchored at one end to the forward casing half and extends therefrom generally parallel to the forward face of the diaphragm and between the flanges 25. The leaf spring 26 is preferably flanged throughout the major portion of its length except for a short portion adjacent to its mounting with outwardly extending flanges 27 which serve to strengthen the spring so that it pivots about a vertical axis adjacent to its mounting. The spring is secured to the diaphragm by forming the flanges 25 and 27 with registering openings through which the outwardly turned ends of a resilient spring clip 28 may extend. When the clip 28 is squeezed together to remove its ends from the openings in the flanges, the diaphragm will be disconnected from the spring, but when the clip is in place, the spring and diaphragm will be securely connected together.

At its free end the spring carries a yoke extension formed with a cylindrical surface 29 curved about a vertical axis. The cylindrical surface 29 of the yoke extension serves to connect the spring and through it the diaphragm to the pointer operating linkage.

As shown best in Figures 3 and 4, the pointer operating linkage is supported by a bracket 31 rigidly mounted on the rear end of the instrument body. The bracket 31 is formed with a lower outwardly extending lug 32 carrying a needle point and at its upper end has a screw 33 terminating in a downwardly extending needle point threaded therethrough. The bracket is further formed with sides 34 formed in their outer surfaces with aligned tapered recesses 35 to receive needle point pivot mountings.

An operating member indicated generally at 36 is mounted in the bracket for pivotal movement about a vertical axis defined by the needle point on the lug 32 and the screw 33. As shown, the operating member 36 is in the form of a yoke mounted with its ends extending toward the bracket to be pivotally supported between the needle points for turning about a vertical axis. Intermediate its ends the yoke carries a pin 37 which projects through an opening in the end of the casing to engage the cylindrical surface 29. If desired, a flexible seal 38 may be provided connecting the pin to the casing end to prevent escape of pressure around the pin. As the diaphragm moves it will move the spring member and through it will move the yoke extension on which the surface 29 is formed thereby to swing the pin 37 and to turn the operating member 36 about its vertical pivotal axis.

According to one feature of the invention the interengaging surfaces of the pin and the cylindrical surface 29 are so shaped and mounted as to compensate for changes in effective area of the diaphragm as it moves. Where movement in only one direction downward, as seen in Figure 2, is desired, the pin may have a perfectly straight surface and the bracket is so arranged that the pivotal axis of the operating member is substantially in alignment with the spring. Thus the straight side of the pin will normally engage the cylindrical surface 29, as shown in Figure 2, and as the spring and the cylindrical surface move downward the pin 37 will rock on the cylindrical surface to lengthen the effective radius of the spring and to decrease the effective radius of the pin. Thus as the diaphragm deflects and its effective area decreases the leverage between the diaphragm and the operating member will be increased proportionately so that the effective decrease of diaphragm area will be compensated.

When movement in both directions is contemplated, as for example in a draft gauge, the pin is formed with a tapered point, as shown in Figure 2, and engages the surface 29 at the juncture of the straight portion and tapered portions of the pin when the diaphragm is in its neutral position. If the diaphragm is displaced upward, as shown in Figure 2, the point of contact between the pin and the surface 29 will shift to the right, but due to tapering of the point the pin will swing further than would be the case if it were straight. By properly selecting the taper on the end of the pin the additional movement can be made such as to compensate for decrease in effective area of the diaphragm so that movement of the pin will be directly proportional to changes in the pressure being measured.

The operating member 36 carries a bracket 39 which is mounted thereon for vertical shifting movement. As shown, the bracket 39 is yoke shaped with elongated openings 41 in its web to receive screws threaded into the web of the operating member 36. The ends of the bracket 39 overlie the upper and lower surfaces of the operating member and carry adjusting screws 42 which will engage the upper and lower ends of the operating member. By loosening the screws 41 and adjusting the screws 42, the bracket 39 may be accurately shifted to any desired vertical position on the operating member 36 and may then be locked in the selected position by the screws extending through the openings 41.

The bracket carries an extension 43 projecting forwardly toward the instrument body and which carries an outwardly projecting pin 44 extending horizontally therefrom.

The pointer 17 is adapted to be carried by a supporting member 45 which is in the form of a yoke mounted with its lugs extending over and pivoted to the sides 34 of the bracket on a horizontal axis. The supporting member 45 may carry pivot pins which engage the tapered recesses 35 in the sides of the bracket, as shown in Figure 2. The supporting member 45 has a bracket 46 secured thereto which is provided with outwardly extending ears 47 over the web of the supporting member and an arm 48 extending over one side of the supporting member and offset therefrom at its end. A pin 49 is formed with a flattened portion extending between the side of the supporting member and the offset end of the bracket and pivotally connected thereto on a horizontal axis by one of the pivot pins for the bracket as shown in Figure 2. The lower end of the pin 49 is urged into engagement with the pin 44 by a tension spring 51 connected to the pin 49 below its pivot and to the lower ear 47. Pivotal movement of the pin 49 is adjustably stopped by a hook member 52 hooked into the upper end of the pin 49 and extending through the upper ear 47 and carrying an adjusting nut 53. Adjustment of the nut 53 will set the zero position of the pointer, as explained more fully hereinafter.

The pointer is carried by a supporting element 54, as best seen in Figure 4, which is generally channel shaped with its flanges 55 spaced apart to overlie the upper and lower edges of the supporting member 45. A portion of the web of the supporting element 54 is cut away to leave a flexible tongue 56 which may be secured to the side of the supporting member 45 by screws 57, as seen in Figure 1. The tongue 56 is adapted to flex to permit swinging movement of the pointer toward and away from the front side of the instrument body.

To adjust the position of the pointer the bracket 46 is formed with an outwardly extending ear 58 and the end of the supporting element 54 carries a threaded rod 59 which extends through the ear 58 and carries an adjusting screw 61 on the opposite side thereof. A compression spring 62 is mounted between the supporting element 54 and the ear 58 to urge the rear end of the supporting element outwardly, thereby to swing the pointer closer to the instrument body.

With the parts assembled, the pointer can be adjusted toward and away from the instrument body very easily and simply by adjusting the screw 61 until the desired clearance is obtained. When once adjusted, the pointer will remain in its adjusted position so that it can swing freely past the instrument body and over the scale without interference.

For zero adjustment, the screw 53 may be turned to swing the pin 49 toward or away from the pin 44. If the pin 49 is swung toward the pin 44, the supporting member 45 will be turned counter-clockwise, as seen in Figure 1, to raise the pointer, while if the pin 49 moves away from the pin 44, the supporting member 45 will be turned clockwise to lower the pointer. Thus by adjusting the nut 53 the zero position of the pointer can be accurately set without interfering with the calibration of the instrument.

For calibrating the instrument the screws extending through the openings 41 are loosened and the screws 42 are adjusted to shift the bracket 39 either up or down relative to the operating member 36. This adjustment will move the pin 44 longitudinally of the pin 49 to change the leverage ratio between them so that a given turning movement of the operating member 36 will effect a different amount of turning movement of the pointer supporting member. In this way the instrument can be easily and accurately calibrated.

It will be noted that all of the linkage is supported directly at the rear end of the instrument body and that all of the adjustments are readily accessible through the rear end of the casing 10 without requiring removal of the instrument mechanism. The only tool required is a simple screw driver for loosening the screws which hold the bracket 39 and for adjusting the screws 42. All of these adjustments can easily be made simply by removing the rear closure of the casing and without disturbing the instrument mechanism itself. It will further be noted that excessive movement of the diaphragm and operating member 36 cannot damage the pointer since the spring 51 will yield before the pointer can be damaged.

While one embodiment of the invention has been shown and described in detail, it will be understood that this is for the purpose of illustration only and is not to be taken as a definition of the scope of the invention, reference being had for this purpose to the appended claims.

What is claimed is:

1. An indicating instrument comprising a body, an element in the body movable in response to changes in a condition to be indicated, a pointer movable in a plane normal to the direction of movement of the element, a support for the pointer pivoted on the body on an axis parallel to the direction of movement of the element, an operating member pivoted on the body on an axis perpendicular to the pivotal axis of the support, means connecting the operating member to the element to turn the operating member as the element moves, an elongated substantially straight first pin secured to the operating member and lying generally parallel to and spaced from the axis of the support, an elongated substantially straight second pin secured to the support and lying generally parallel to and spaced from the axis of the operating member and slidably engaging the first pin, adjusting means to move one of the pins in a direction normal to the other pin to adjust the zero position of the pointer, and adjusting means to move one of the pins lengthwise of the other pin to calibrate the instrument.

2. An indicating instrument comprising a body, an element in the body movable in response to changes in a condition to be indicated, a pointer movable in a plane normal to the direction of movement of the element, a support for the pointer pivoted on the body on an axis parallel to the direction of movement of the element, an operating member pivoted on the body on an axis perpendicular to the pivotal axis of the support, means connecting the operating member to the element to turn the operating member as the element moves, a first pin carried by the operating member and lying generally parallel to the axis of the support, a second pin carried by the support and lying generally parallel to the axis of the operating member and slidably engaging the first pin, a bracket carrying one of the pins, means mounting the bracket on the member by which said one of the pins is carried for sliding movement parallel to the pivotal axis of the member, and adjusting means to adjust the position of the bracket thereby to calibrate the instrument.

3. An indicating instrument comprising a body, an element in the body movable in response to a condition to be indicated, an operating member pivoted on one end of the body on an axis perpendicular to the direction of motion of the element, means connecting the operating member to the element to turn the operating member as the element moves, a supporting member pivoted on said end of the body on an axis perpendicular to the pivotal axis of the operating member, the supporting member including a relatively narrow flat side elongated in a direction perpendicular to the axis of the supporting member, a pointer including a channel shaped mounting portion with a part of its web cut away to leave a flexible tongue, means to secure the tongue to the flat side with the flanges of the channel extending over the edges of the flat side, adjusting means connecting the end of the channel to the supporting member to adjust the angle of the pointer relative to the flat side of the supporting member, and means operatively connecting the supporting member to the operating member to turn the supporting member as the operating member turns.

4. An indicating instrument comprising a body, an element in the body movable in response to a condition to be indicated, an operating member pivoted on one end of the body on an axis perpendicular to the direction of motion of the element, means connecting the operating member to the element to turn the operating member as the element moves, a supporting member pivoted on said end of the body on an axis perpendicular to the pivotal axis of the operating member, a pointer carried by the supporting member, a pin carried by each of the members and lying generally parallel to the pivotal axis of the other member, the pins engaging to turn the supporting member as the operating member turns, one of the pins being pivoted on the member by which it is carried on an axis parallel to the pivotal axis of the member, a spring urging said pin in one direction about its pivot, and an adjustable stop to limit pivotal movement of the pin in said one direction, the spring being adapted to yield upon excessive movement of the element in one direction to prevent damage to the pointer.

5. In an indicating instrument, a hollow casing, a flexible diaphragm in the casing adapted to flex in response to fluid pressure, a leaf spring extending along one face of the diaphragm and formed with edge flanges having openings therethrough, flanges on the diaphragm overlying the edges flanges on the spring and formed with openings registering with the openings in the spring flanges, a U-shaped spring having outwardly turned ends passing through the openings in the flanges to secure the spring to the diaphragm, and a pointer operatively connected to the spring to be moved thereby.

6. In an indicating instrument, a hollow casing, a flexible diaphragm in the casing adapted to flex in response to fluid pressure, said diaphragm having a rigid central portion and a flexible annular edge portion, a first lever lying generally parallel to the diaphragm for pivotal movement about an axis at one side of the diaphragm and connected to the rigid central portion of the diaphragm to be moved thereby, the first lever terminating at its free end in an arcuately curved surface, a second straight lever pivoted on an axis parallel to and spaced from the axis about which the first lever moves, and engaging said arcuately curved surface, and a pointer operatively connected to the second lever, the point of engagement between the second lever and the arcuately curved surface shifting as the diaphragm moves to compensate for changes in effective area of the diaphragm.

7. In an indicating instrument, a hollow casing, a flexible diaphragm in the casing adapted to flex in response to fluid pressure, said diaphragm having a rigid central portion and a flexible annular edge portion, a first lever lying generally parallel to the diaphragm for pivotal movement about an axis at one side of the diaphragm, and connected to the rigid central portion of the diaphragm to be moved thereby, the first lever terminating at its free end in an arcuately curved surface, a second straight lever pivoted on an axis parallel to and spaced from the axis about which the first lever moves, the second lever having a straight portion terminating in a tapered tip and engaging the arcuately curved surface at the junction of the straight portion and the tapered tip when the diaphragm is in its neutral position, the point of engagement between the second lever and the curved surface shifting upon movement of the diaphragm in either direction from its neutral position to compensate for changes in the effective area of the diaphragm.

8. In an indicating instrument, a pointer support pivoted for movement about a fixed axis and including an elongated flat side, a pointer including a rigid extension having side flanges and a flexible integral tongue between the side flanges lying adjacent and parallel to the extension, means to secure the tongue to the flat side of the pointer support with the pointer extending along and generally parallel to the flat side of the pointer support and the side flanges projecting over the edges of the support, adjusting means connecting the end of the extension to the pointer support to adjust the pointer laterally toward and away from the flat side of the pointer support.

References Cited in the file of this patent

UNITED STATES PATENTS

| | | |
|---|---|---|
| 1,916,188 | Bacon et al. | July 4, 1933 |
| 1,960,745 | Luckey | May 29, 1934 |
| 2,196,932 | Menzer | Apr. 9, 1940 |
| 2,459,931 | Furn | Jan. 25, 1949 |
| 2,538,125 | Reid | Jan. 16, 1951 |
| 2,697,147 | Harland | Dec. 14, 1954 |

FOREIGN PATENTS

| | | |
|---|---|---|
| 616,098 | Great Britain | Jan. 17, 1949 |